United States Patent
Eberl et al.

[11] Patent Number: 5,932,842
[45] Date of Patent: Aug. 3, 1999

[54] STRENGTH MEMBER FOR COMBINED FLUID/ELECTRICAL HOSE

[75] Inventors: Adolf Eberl; Rolf Eberl; Peter Eberl, all of Kincardine, Canada

[73] Assignee: The University of Alberta, Canada

[21] Appl. No.: 08/879,979

[22] Filed: Jun. 20, 1997

[51] Int. Cl.[6] .................................................. F16L 11/12
[52] U.S. Cl. ............................................ 174/47; 439/194
[58] Field of Search ................................... 174/47, 74 R; 439/194, 191, 449, 451; 141/382, 279; 134/22.11; 15/312.2; 138/122, 133, 126, 155, 138

[56] References Cited

U.S. PATENT DOCUMENTS

| | | |
|---|---|---|
| 3,314,039 | 4/1967 | Opper . |
| 3,457,359 | 7/1969 | Soucy . |
| 3,899,631 | 8/1975 | Clark . |
| 3,928,715 | 12/1975 | Holden ........................................ 174/47 |
| 4,132,576 | 1/1979 | Neroni et al. ............................. 156/143 |
| 4,150,862 | 4/1979 | Markowitz . |
| 4,368,348 | 1/1983 | Eichelberger et al. .................... 174/47 |
| 4,399,319 | 8/1983 | Zinn ........................................... 174/47 |
| 4,462,649 | 7/1984 | Medford et al. .......................... 439/192 |
| 4,470,433 | 9/1984 | Vipond et al. ............................ 138/106 |
| 4,675,780 | 6/1987 | Barnes et al. . |
| 5,038,705 | 8/1991 | Shapiro et al. ........................... 116/209 |
| 5,172,765 | 12/1992 | Sas-Jaworsky et al. ................. 166/384 |
| 5,216,778 | 6/1993 | Suzuki et al. ............................ 15/327.1 |
| 5,459,901 | 10/1995 | Blase et al. ................................ 15/321 |
| 5,555,915 | 9/1996 | Kanao ....................................... 138/133 |

FOREIGN PATENT DOCUMENTS

| | | | |
|---|---|---|---|
| 651300 | 5/1993 | Australia .................................. 174/47 |

Primary Examiner—Kristine Kincaid
Assistant Examiner—Dhiru R. Patel
Attorney, Agent, or Firm—Fish & Richardson P.C.

[57] ABSTRACT

This invention relates to a strength member for a hose and to an improved combined fluid/electrical hose. The strength member of the present invention is a low stretch high strength natural or artificial fibre material which may be incorporated into the bore of the hose and fastened to a hose end termination connector at each end to limit stretch of the hose. In the improved combined fluid/electrical hose of the present invention, the electrical wire extends longitudinally and freely the full length of the hose without attachment to the inner hose wall. This combined fluid/electrical hose also including a strength member.

25 Claims, 2 Drawing Sheets

STRENGTH MEMBER FOR COMBINED FLUID/ELECTRICAL HOSE

FIELD OF INVENTION

This invention relates to a strength member for a hose and to an improved combined fluid/electrical hose.

BACKGROUND OF THE INVENTION

Most combined fluid and electrical hoses have the wires built into the wall of the hose in a straight, spiralled or braided fashion. These wires are placed around or along the outside surface of the inner hose before the outer jacket is moulded into place or they are embedded in one of the hose layers.

U.S. Pat. No. 3,457,359 to Soucy discloses one such hose having a wire braid reinforcing layer which acts as a grounding conductor to dissipate electric charge which may build up in the hose. U.S. Pat. No. 4,675,780 to Barnes also discloses a reinforced integral layer of conductive fiber bundles.

U.S. Pat. No. 3,899,631 to Clark discloses an inflatable tube having electrical conductors which are integrally formed in the elastomer outer cover of the inflatable tube.

These hoses are special application products made at greater expense than a normal fluid or air hose and which after manufacture is converted to add the electrical connection capability. Typically the production of special application hoses involves extensive development costs and large start-up production quantities for each version.

In use, when initially pressurised, a combined air or fluid and electrical hose contracts. It also stretches beyond its original length when subjected to lengthwise tension. The embedded wire, subjected to compressive and tensile forces, kinks and stretches out. Repetition of the stretching and kinking of the wire causes the wire to fail and break two to three inches from the terminations after a very short period of time, even during normal usage.

In the present invention, the electrical wire extends longitudinally and freely the full length of the hose without attachment to the inner hose wall. Further, the present invention provides a strength member which may be incorporated into the bore of the hose to limit stretch of the hose.

SUMMARY OF TEE INVENTION

In one aspect, this invention relates a strengthened hose, said hose having a length and a bore, comprising a strength member inside said bore and freely extending substantially said length to limit stretch of said hose along said length; and a hose end termination connector secured to each end of said hose and to which said strength member is fastened.

In another aspect, this invention relates to a combined fluid/electrical hose assembly comprising a hose having a length and a bore; at least one electrical wire inside said bore longitudinally and freely extending substantially said length and exiting said hose; at least one strength member inside said bore longitudinally and freely extending substantially said length to limit stretch of said hose along said length; a combined fluid/electrical hose end termination connector secured to each end of said hose wherein said strength member is fastened to each said termination connector.

Yet in another aspect, this invention relates to a combined fluid/electrical hose assembly comprising a hose having a length and a bore; at least one electrical wire inside said bore longitudinally and freely extending substantially said length and exiting said hose; at least one strength member inside said bore longitudinally and freely extending substantially said length to limit stretch of said hose along said length; a combined fluid/electrical hose end termination connector secured to each end of said hose wherein said strength member is fastened to each said termination connector, whereby overstress of said at least one electrical wire is avoided thereby to extend the life of said at least one electrical wire.

DETAILED DESCRIPTION OF THE PREFERRED EMBODIMENT

Figure 1:
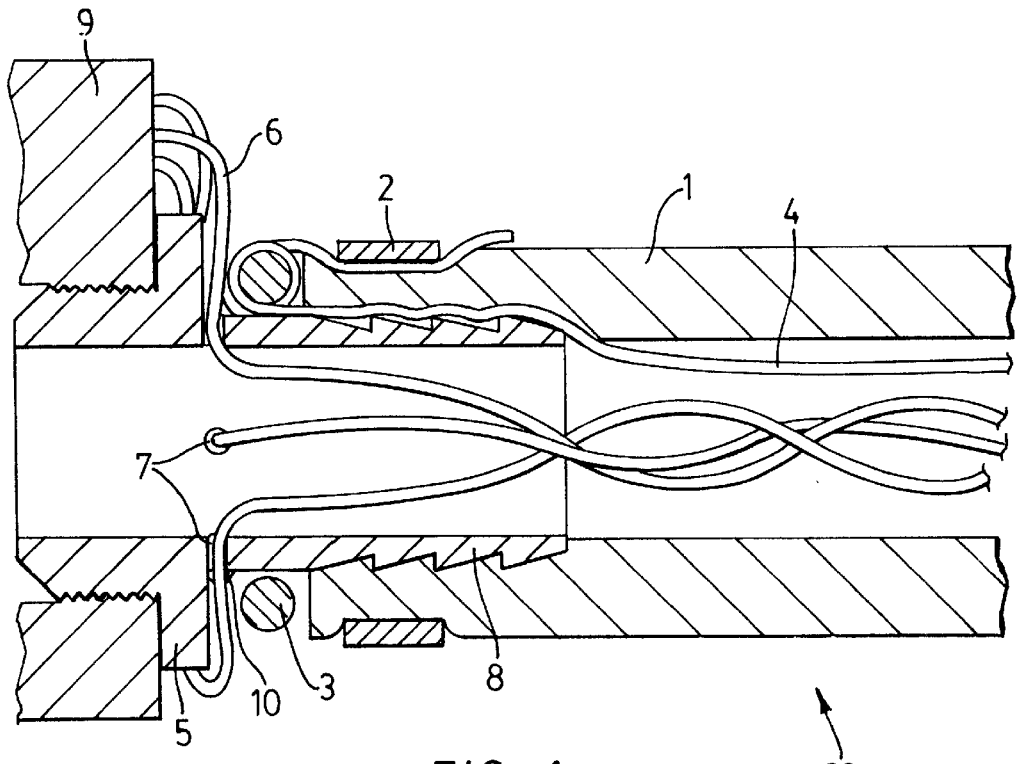
FIG. 1 is a side sectional view of an embodiment of the present invention.

With reference to FIG. 1, a preferred combined fluid/electrical hose assembly of the present invention is designated by numeral 20. This hose assembly comprises hose 1 which may be elastomeric or plastic and of any length consistent with the supply of fluids and gases at the specified pressure and flow-rates from the source to the terminating equipment of the user. One or more insulated electrical wires 6 extends longitudinally and freely the full length of the hose bore without attachment to the inner hose wall, thereby simplifying the assembly of electrical wires into a normal application fluid or air hose to produce a combined fluid/electrical hose.

The hose assembly further comprises a hose end termination connector 5 at each end of the hose, which forms a part of combined air or fluid/electrical hose end connector 9. Hosebarb shaft 8 of hose end termination connector engages the hose and the hose is securely held in place by hose clamp 2. Hose end termination connector 5 may also be connected directly to the terminating machine or protective suit.

A strength member 4 is incorporated into the hose bore and anchored to each hose end termination connector 5. Strength member 4, as it exits the hose, is wrapped around an anchor ring 3 and hose clamp 2 clamps the strength member to prevent slippage. Strength member 4, at the point of exit, is sealed with sealant or adhesive 10 to prevent air or fluid leakage. The strength member may be aramid, graphite fibre, metal cable or any low stretch manmade material or natural fibre. The strength member so anchored prevents the hose from stretching when tension is applied to the hose. The strength member of the present invention may be used with a low priced fluid or air hose and a low priced, insulated wire to manufacture a reliable, rugged combined fluid/electrical hose. Its main applications include protective suit air/communication supply hoses, robotic supply hoses and umbilical supply hoses for medium and heavy duty machinery.

Electrical wires 6 which are floating freely through the length of the hose bore are brought out of the hose bore through hosebarb shaft 8 via feed-through holes 7 and the holes sealed with sealant or adhesive 10 to prevent air or fluid leakage. Prior to installation, electrical wires 6 are twisted tightly and then the tension from twisting relieved to open up the twists and make the wire harness slightly elastic; this gives enough stretch to accommodate the minimal stretch of the strength member.

Figure 2:
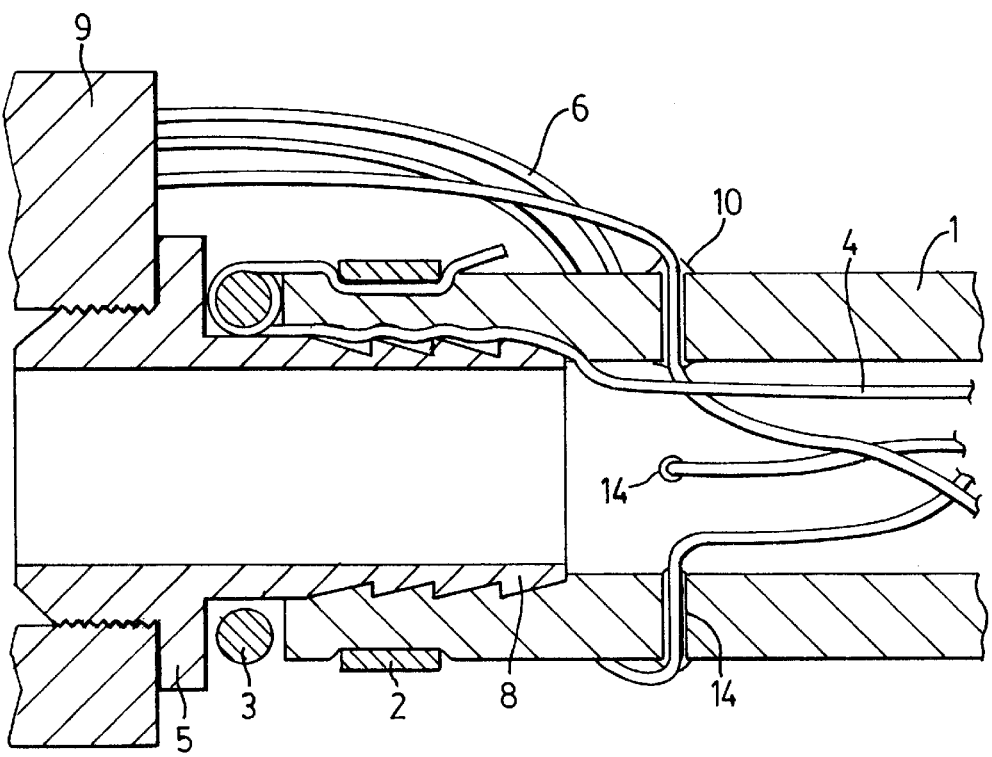
FIG. 2 is a side sectional view of another embodiment of the invention.

Referring to FIG. 2, electrical wires 6 may also exit through feed-through holes 14 in hose 1; holes 14 are sealed with sealant or adhesive 10 at the point of exit.

Figure 3:
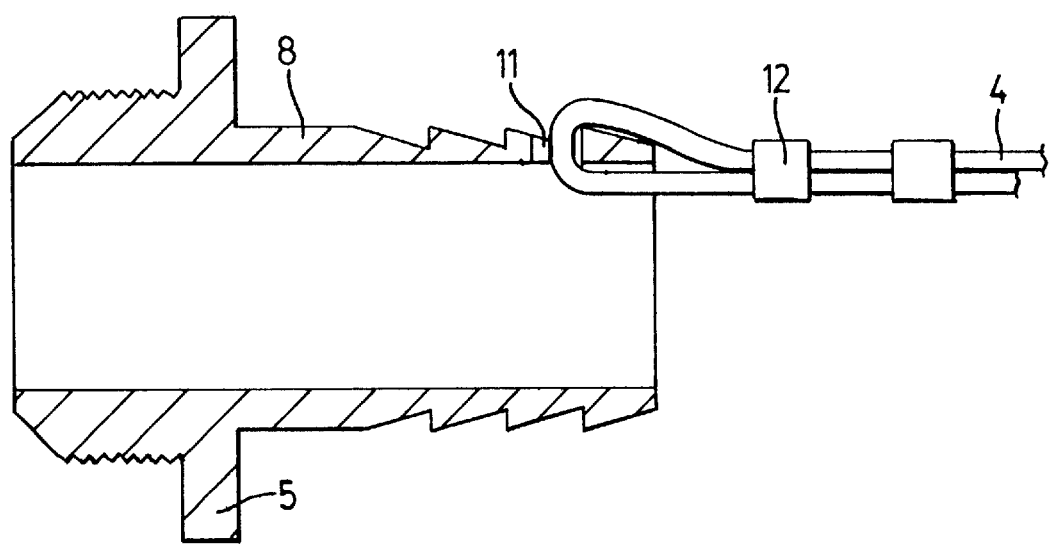
FIG. 3 is a side sectional view of another embodiment showing a strength member anchored to a combined fluid/electrical hose end termination connector.

Referring to FIG. 3, as an alternative to attaching strength member 4 to hose end termination connector 5 with anchor ring 3 and hose clamp 2, the strength member may be anchored directly to hose termination connector 5, through anchor hole 11 drilled radially to the hosebarb shall axis or hoop which forms a part of the hose end termination connector 5. The strength member is looped around anchor hole 11 and is fastened to itself with crimp ferrules 12 to prevent slippage.

It will be appreciated by one skilled in the art that various modifications can be made to the exemplified embodiment without departing from the scope and spirit of the invention Such modifications are also intended to be within the scope of the invention.

We claim:

1. A combined fluid/electrical hose assembly comprising:
   a hose having a length and a bore;
   at least one electrical wire inside said bore longitudinally and freely extending substantially said length and exiting said hose;
   at least one strength member inside said bore longitudinally and freely extending substantially said length to limit stretch of said hose along said length;
   a combined fluid/electrical hose end termination connector secured to each end of said hose wherein said strength member is fastened to each said termination connector.

2. A combined fluid/electrical hose assembly comprising:
   a hose having a length and a bore;
   at least one electrical wire inside said bore longitudinally and freely extending substantially said length and exiting said hose;
   at least one strength member inside said bore longitudinally and freely extending substantially said length to limit stretch of said hose along said length;
   a combined fluid/electrical hose end termination connector secured to each end of said hose wherein said strength member is fastened to each said termination connector, whereby overstress of said at least one electrical wire is avoided thereby to extend the life of said at least one electrical wire.

3. The combined fluid/electrical hose assembly as in claim 1 wherein said hose is elastomeric or plastic.

4. The combined fluid/electrical hose assembly as in claim 1 wherein each said termination connector comprises at least one exit hole for said at least one wire.

5. The combined fluid/electrical hose assembly as in claim 1 wherein each said termination connector comprises a hosebarb shaft for insertion into said hose.

6. The combined fluid/electrical hose assembly as in claim 5 wherein each said termination connector is secured to an end of said hose by a clamping device.

7. The combined fluid/electrical hose assembly as in claim 6 wherein said strength member is fastened to each said termination connector by an anchor assembly.

8. The combined fluid/electrical assembly as in claim 7 wherein said anchor assembly comprises an anchor ring engaging said hosebarb shaft around which said strength member is wrapped as said strength member exits from said hose end.

9. The combined fluid/electrical assembly as in claim 8 wherein said anchor assembly further comprises said clamping device for clamping said strength member to each said termination connector to prevent slippage.

10. The combined fluid/electrical assembly as in claim 7 wherein said anchor assembly comprises an anchor member in said hosebarb shaft, said strength member being looped from an inner end of said hosebarb shaft, around said anchor member and back on itself.

11. The combined fluid/electrical assembly as in claim 10 wherein said anchor assembly further comprises a clamping device to clamp said strength member to itself proximate said inner end of said hosebarb shaft.

12. The combined fluid/electrical assembly as in claim 10 wherein said anchor member is an anchor hole in said hosebarb shaft.

13. The combined fluid/electrical hose assembly as in claim 1 wherein said strength member comprises of a low stretch, high strength, natural or artificial fibre material.

14. The combined fluid/electrical hose assembly as in claim 13 wherein said strength member comprises of a low stretch metal alloy wire cable.

15. The combined fluid/electrical hose assembly as in claim 1 wherein said at least one wire is relaxed along said length of said hose to accommodate minimal stretch of said hose permitted by said strength member.

16. A strengthened hose, said hose having a length and a bore, comprising:
    a strength member inside said bore and freely extending substantially said length to limit stretch of said hose along said length; and
    a hose end termination connector secured to each end of said hose and to which said strength member is fastened.

17. The strengthened hose as in claim 16 wherein said strength member comprises of a low stretch, high strength, natural or artificial fibre material.

18. The strengthened hose as in claim 17 wherein said strength member is a low stretch metal alloy wire cable.

19. The strengthened hose as in claim 16 wherein said termination connector comprises a hosebarb shaft for insertion into said hose.

20. The strengthened hose as in claim 19 wherein said strength member is fastened to each said termination connector by an anchor assembly.

21. The strengthened hose as in claim 20 wherein said anchor assembly comprises an anchor ring engaging said hosebarb shaft around which said strength member is wrapped.

22. The strength member assembly as in claim 21 wherein said anchor assembly further comprises a clamp for clamping said strength member to each said termination connector to prevent slippage.

23. The strength member assembly as in claim 20 wherein said anchor assembly comprises an anchor member in said hosebarb shaft, said strength member being looped from an inner end of said hosebarb shaft, around said anchor member and back on itself.

24. The strength member assembly as in claim 23 wherein said anchor assembly further comprises a clamping device to clamp said strength member to itself proximate said inner end of said hosebarb shaft.

25. The strength member assembly as in claim 23 wherein said anchor member is an anchor hole in said hosebarb shaft.

* * * * *